United States Patent [19]

Gregory

[11] Patent Number: 5,610,823

[45] Date of Patent: Mar. 11, 1997

[54] METHOD FOR SPINDLE SPEED OPTIMIZATION OF MOTION PROFILE

[75] Inventor: Raymond D. Gregory, Muskogee, Okla.

[73] Assignee: Coburn Optical Industries, Inc., Tulsa, Okla.

[21] Appl. No.: 571,777

[22] Filed: Dec. 13, 1995

[51] Int. Cl.$^6$ .............................. G06F 19/00; G06G 7/64; G06G 7/66

[52] U.S. Cl. ................................ 364/474.15; 364/474.28; 364/474.29; 364/474.3; 364/474.31; 364/167.01; 318/561; 318/569; 318/573

[58] Field of Search .................... 364/474.15, 474.28, 364/474.29, 474.3, 474.31, 167.01, 107; 318/561, 569, 573, 602

[56] References Cited

U.S. PATENT DOCUMENTS

| | | | |
|---|---|---|---|
| 3,656,377 | 4/1972 | Kosem | 82/1 C |
| 4,079,235 | 3/1978 | Froyd et al. | 364/107 |
| 4,347,470 | 8/1982 | Kohzai et al. | 318/602 |
| 5,404,308 | 4/1995 | Kajiyama | 364/474.3 |

*Primary Examiner*—Roy N. Envall, Jr.
*Assistant Examiner*—Monica Lewis
*Attorney, Agent, or Firm*—Frank J. Catalano; Scott R. Zingerman

[57] ABSTRACT

A method of speed optimization of a spindle component of a machine having multiple synchronized components moving along multiple axes over a motion profile. The method including a first step further including: obtaining a motion error value of a synchronous component over the motion profile as a function of frequency; identifying a plurality of contour portions of the motion profile; specifying the motion error tolerance for the motion profile according to the requirement of the application; calculating component numbers and component values of the synchronized component over a selected contour portion using a Fast Fourier Transform (FFT); selecting a first speed of the spindle component; calculating spindle frequency from the speed of the spindle component; and a second step further including: multiplying the spindle frequency by the component numbers to obtain tool component frequencies; calculating the motion error value for selected tool component frequencies; multiplying the motion error value of the frequency defined by the component number, and the component value to obtain an error prediction for each component number; combining the error predictions for each component number to obtain a maximum predicted motion error for the contour portion; comparing the maximum predicted motion error for the contour portion with the motion error tolerance wherein the maximum predicted motion error must be less than the motion tolerance; and selecting the greatest spindle speed wherein the maximum predicted motion error is less than the tolerance. The method of the present invention further includes interpolating the optimum spindle speed over the entire motion profile.

2 Claims, 4 Drawing Sheets

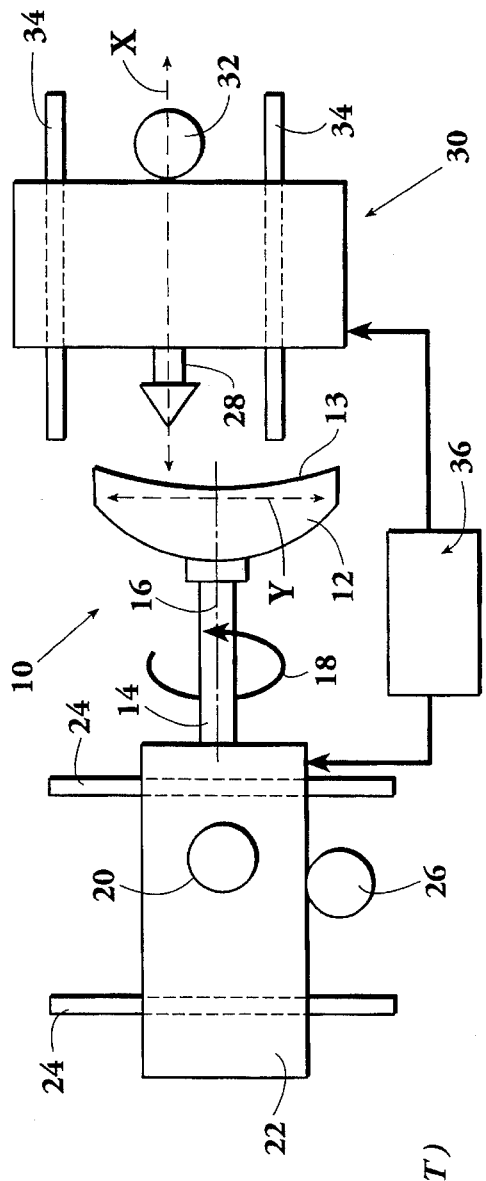
Fig. 1
(PRIOR ART)
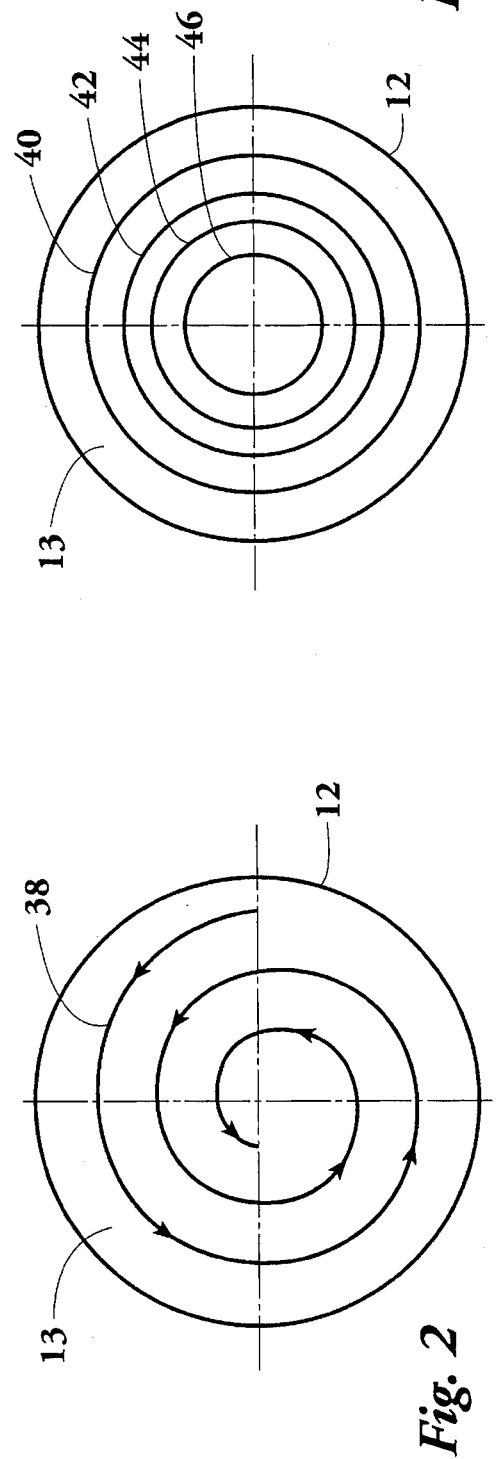
Fig. 2
Fig. 3

METHOD FOR SPINDLE SPEED OPTIMIZATION OF MOTION PROFILE

BACKGROUND OF THE INVENTION

1. Field of the Invention

The present invention relates to methods for optimizing the speed of a spindle over an entire motion contour in a synchronous system. More specifically, optimizing the speed of a spindle within the limit of motion error of a synchronized component in a motion profile.

2. Background of the Invention

It is common in manufacturing and industrial processes of various types to move a first component synchronously with a second or plurality of components. One such common synchronous system includes a machine that moves a first component, such as a tool, synchronously with a rotating spindle having a part thereon. Machines of this type are commonly used for machining ophthalmic lenses. In such applications, the first component moves synchronously with the rotating spindle in order to follow contours on the part that are not rotationally symmetric with respect to the spindle. The motion profile of the first component, therefore, will have frequency components that depend on the rotational speed of the spindle.

It is often beneficial to rotate the spindle at its maximum speed in order to maximize throughput and efficiency of the machine. However, as the spindle speed increases, the intensity of the motion of the synchronized component (the tool) also increases. It is necessary then, to take into account the velocity, acceleration, and cut-off frequency constraints of the synchronized component as well as the maximum rotational speed of the spindle in order to optimize the motion profile.

As stated above, in general, it is beneficial to rotate the spindle as fast as possible without exceeding the velocity, acceleration, and cut-off frequency limit characteristics of the synchronized motion axis. Increasing the speed of the spindle presents a significant problem in that the motion error of the synchronized component increases as the spindle speed increases. Motion error is most commonly measured in terms of following error, dB gain error, phase lag and other components relating to the synchronized system. The motion error of the synchronized component must not exceed pre-defined requirements. If it were possible to estimate by calculation beforehand the motion error of a portion of the motion contour at a particular (selected) spindle speed, it would be possible to optimize the motion of that portion of the contour for both speed and accuracy. A need, therefore, exists when using a machine that moves a first component synchronously with a rotating spindle for a method of estimating the motion error of a portion of the motion contour at a particular spindle speed in order to optimize the motion of that portion of the contour for both speed and accuracy.

A second problem is that calculation of the optimum spindle speed through calculation beforehand of the motion error of a portion of the motion contour relates only to the specified portion of the motion contour. A need, therefore, also exists for a method for obtaining the optimum spindle speed across the entire motion contour.

SUMMARY OF THE INVENTION

This method includes a first step having a plurality of substeps, including: method of calculating motion error as a function of spindle speed by measuring motion error (in terms of amplitude) of a synchronous machine component (such as a tool) as a function of frequency of a motion contour. The measured data is then used to generate a function that predicts motion error (in terms of amplitude) as a function of frequency of the synchronous machine component.

The first step of the present invention further includes specifying the motion error tolerance for the motion profile according to the requirement of the application. A plurality of contour portions of the motion profile are identified and then component numbers (in units of cycles/spindle revolution) and component values (in units of microns amplitude) for each component number of the synchronous component on a selected contour portion are calculated using a Fast Fourier Transform (FFT). A spindle speed (in rpm) is then selected from which spindle frequency (in rps) is calculated.

A second step of the method of the present invention further includes calculating spindle frequency for each component number obtained and multiplying that spindle frequency by the component numbers to obtain tool component frequencies (in Hz). The motion error value for selected tool component frequencies is next calculated. The component value (in microns) is multiplied by the motion error value (in %) at the frequency described above defined by the component number and multiplied by the component value to obtain a motion error prediction (in microns) for each component. The error predictions are then combined (usually by adding) to obtain the maximum predicted motion error along a selected contour portion.

The maximum predicted motion error along the selected contour portion is then compared with the specified motion error tolerance for the motion profile. Motion error tolerances are known values set for the motion profile according to the requirements of the application. The maximum predicted motion error along the selected contour portion must be less than the motion error tolerance.

The optimum spindle speed is the maximum speed wherein the maximum predicted motion error along a selected contour portion does not exceed the set motion error tolerance. Therefore, the second step of the method described above is repeated for multiple spindle speeds in order to obtain the optimum spindle speed.

Once the optimized spindle speed is calculated for a specific contour portion, the method is then repeated for a plurality of contour portions along the motion contour. The optimized spindle speeds are then interpolated to obtain the optimum spindle speed over the entire motion contour.

It is, therefore, an object of the present invention to obtain a method of optimizing spindle speed and accuracy for a motion contour by calculating motion errors for specific portions of the motion contour and optimizing spindle speed for each of these specific portions.

It is a further object of the present invention for the optimized spindle speed for each selected portion of the motion contour be calculated pursuant to the present method.

It is a yet further object of the present invention to optimize spindle speed for all portions of the entire motion contour by interpolating the results of the optimization for each contour portion.

BRIEF DESCRIPTION OF THE DRAWINGS

Other objects and advantages of the invention will become apparent upon reading the following detailed description and upon reference to the drawings in which:

FIG. 1 is the block diagram illustrating a typical multiple axis motion system to be synchronized;

FIG. 2 is a graphical representation of the true motion of a synchronous component (tool) across the motion contour of the lens of FIG. 1, showing the lens from a front view;

FIG. 3 is a graphical representation of the method of dividing the motion contour of the lens of FIG. 2 into contour positions;

Figure 4:
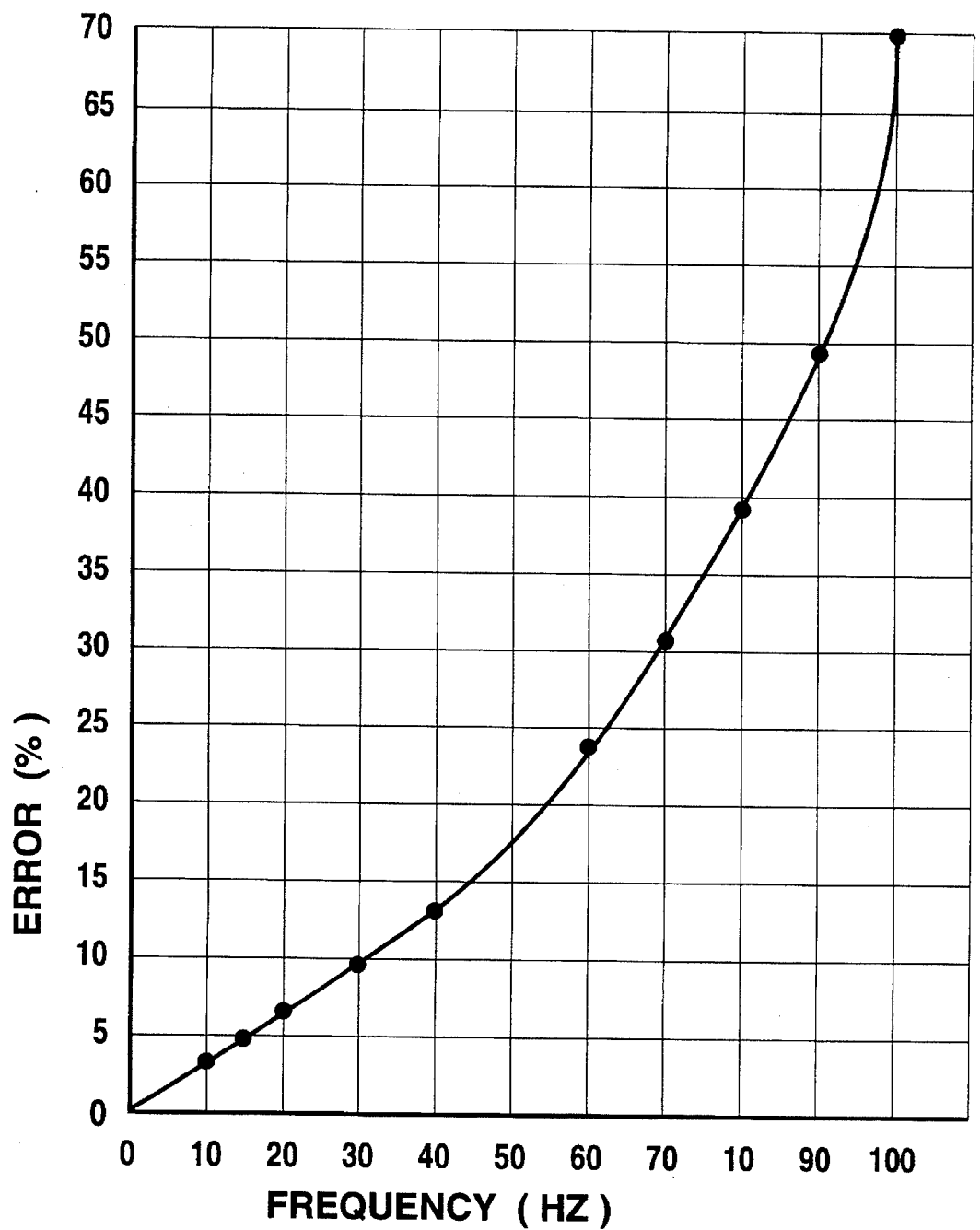
FIG. 4 is a graphical representation of frequency versus motion error in a wide tolerance band.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Referring first to FIG. 1 wherein a machine 10 for synchronized multiple axis motion application for generation of ophthalmic lenses is illustrated. In lathing a selected prescription topography on a lens 12, the lens 12 is mounted for rotation on a spindle 14 which is driven about its axis 16 of the rotation 18 by a drive mechanism 20 supported on a mount 22. The spindle 14 as shown rotates in a clockwise direction looking at the face 13 of the lens 12 to be generated. In addition to this rotational movement, the mount 22 translates along a Y axis, as shown on tracks 24 in response to another drive mechanism 26, such as a motor driving a worm gear. The lathing tool 28 is located on another mount 30 which moves reciprocally in the direction of the X axis in response to a third drive mechanism 32 such as an electric motor connected to a worm gear. As shown, the tool mount 30 reciprocates on tracks 34. In this application, the operation of the three drive mechanisms 22, 26 and 32 must be synchronized so that the combined motion of the tool 28 and the lens 12 provide an accurate motion profile defined by a lens prescription. If the lens prescription defines a toric topography, one revolution of the lens 12 will occur simultaneously with one translation interval of the lens mount 22. However, in that same revolution, the lathing tool mount 30 will experience two full cycles of reciprocation. The operation of the system is controlled by a computer 36.

Turning now to FIG. 2, which is a graphical representation of the true motion of lathing tool 28 across the motion contour to be cut into the face 13 of lens 28 (FIG. 1). FIG. 2 shows lens 28 from a front view exposing face 13. It is understood that the true motion of lathing tool 28 as it passes across face 13 would be a spiral motion 38 because of the synchronized multiple axis motion of machine 10, as shown by FIG. 2.

Referring back to FIG. 1, it is beneficial to rotate spindle 14 as fast as possible Without exceeding the velocity, acceleration and cut-off frequency limit characteristics of the synchronized motion axis in order to maximize throughput and efficiency of machine 10. Increasing the speed of spindle 14 presents a significant problem in that the motion error of lathing tool 28 increases as the speed of spindle 14 increases. Motion error is commonly measured in terms of following error, dB gain error, phase lag and other components relating to the synchronized system. The motion error of tool 28 must not exceed pre-defined requirements. The present invention is a method for estimating the motion error of a portion of the motion contour at a particular spindle speed in order to optimize the motion of that portion of the contour for both speed and accuracy. The present method also includes a method for obtaining the optimum spindle speed across the entire motion contour. Lens 12 of FIG. 1, having a toric shape, would be cut by lathing tool 28 so as to have an accurate motion profile defined by a known lens prescription.

A first step in the method of obtaining the optimum spindle speed for the motion profile defined by a known lens prescription includes obtaining a motion error value R of the synchronous component over the motion profile. This motion error value R is expressed as a function of the frequency of the reciprocation of the tool mount 30. This motion error value R of the synchronous lathing tool component 28 over the motion profile defined by a lens prescription is generally a known value and measured in terms of following error, dB gain error and phase lag relating to the synchronized system. The motion error can also be obtained empirically for a particular system by driving the system at a specific amplitude and frequency and measuring the difference between the command position (the position defined by the lens prescription) and the actual position of lathing tool 28. The measured difference is the following error. The maximum absolute value of the following error is recorded for several different amplitudes for a given frequency. The maximum absolute value of the following error for each amplitude is then divided by that amplitude to obtain motion error (expressed as a percentage). The motion error obtained is the maximum for all measured amplitudes. This method is applied to several different frequencies in addition to the given frequency.

EXAMPLE 1

The motion error for a synchronous system can be obtained, for example, by driving the system at a 10 mm amplitude and at a frequency of 10 Hz. The following error, the difference between the command position defined by the lens prescription and the actual position of the lathing tool is measured for a period of time, wherein the greatest difference between the command position and the actual position is used to obtain the motion error (a worst case).

Command Position=+6 mm

Actual Position=5.8 mm

Command Position−Actual Position=Following Error (Absolute Value)

+6 mm−5.8 mm=0.2 mm (Absolute Value)

Following error÷amplitude=Motion Error 0.2 mm÷10 mm=2%

The following error is then calculated over a selected frequency range and expressed graphically. For example, the following error is typically measured at 5 Hz frequency intervals over the selected frequency range from which motion error percentages are obtained and expressed graphically.

Figure 5:
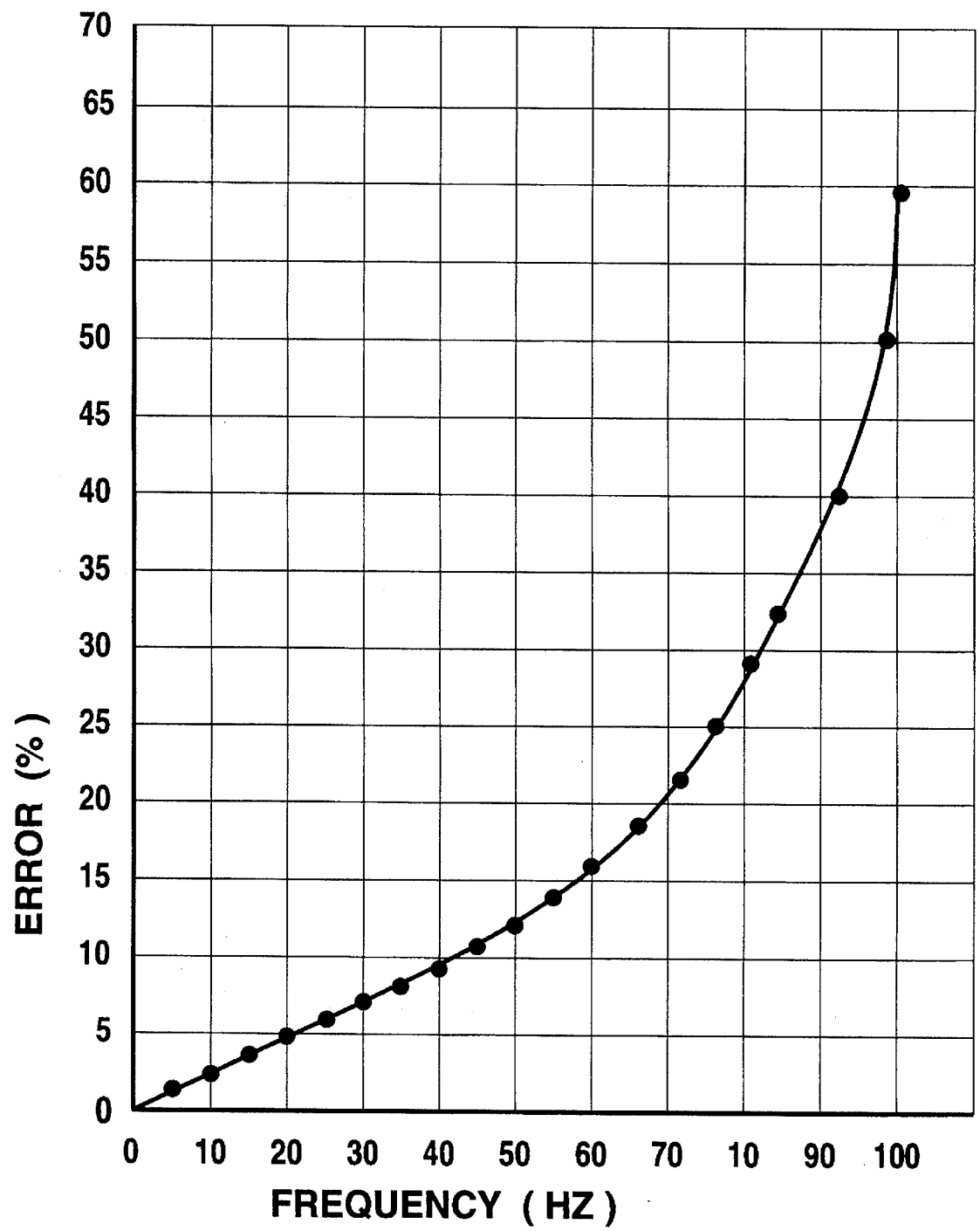
FIG. 5 is a graphical representation of frequency versus motion error for a narrow tolerance band.

It should be pointed out that due to non-linearities in the synchronous system, the motion error will increase as the speed of rotation of the spindle increases. These nonlinearities can be attributed to the increased intensity of reciprocation of lathing tool 28 as the speed of rotation of spindle 14 increases in a synchronous system. The graphical representation of the motion error should be calculated pursuant to the acceptable error tolerances of the lens prescription. For example, a first graphical representation may be used where wider motion error tolerance bands are acceptable such as during a roughing cut of lens 12 and a second graphical representation of motion error may be necessary for applications wherein the tolerance band is narrower such as during the finishing cut of lens 12. FIG. 4 is a graphical representation of motion error for a wider tolerance band wherein the tolerance limit is 100 microns of error. FIG. 5 is a graphical representation of motion error for a narrower tolerance band wherein the tolerance limit equals 30 microns of error.

As can be seen when comparing FIG. 4 with FIG. 5, the error percentages are greater at the same frequency value on FIG. 4 as compared with FIG. 5. This comparison shows that for higher tolerance bands the motion error values will be higher.

Once the motion error values R are obtained as a function of frequency the next substep of the present method includes obtaining component numbers and component values of the synchronous lathing tool component 28 over a selected contour portion using a Fast Fourier Transform (FFT). Referring to FIG. 3, a graphical representation of face 13 of lens 12, a plurality of rings 40, 42, 44, and 46 are drawn on face 13. Rings 40, 42, 44, and 46 each identify a contour portion of the motion profile of lens 12. On FIG. 3, four such contour portions 40, 42, 44, and 46 are identified for the purpose of exemplification, however, in reality, ten to twenty such contour portions are preferred.

Figure 6:
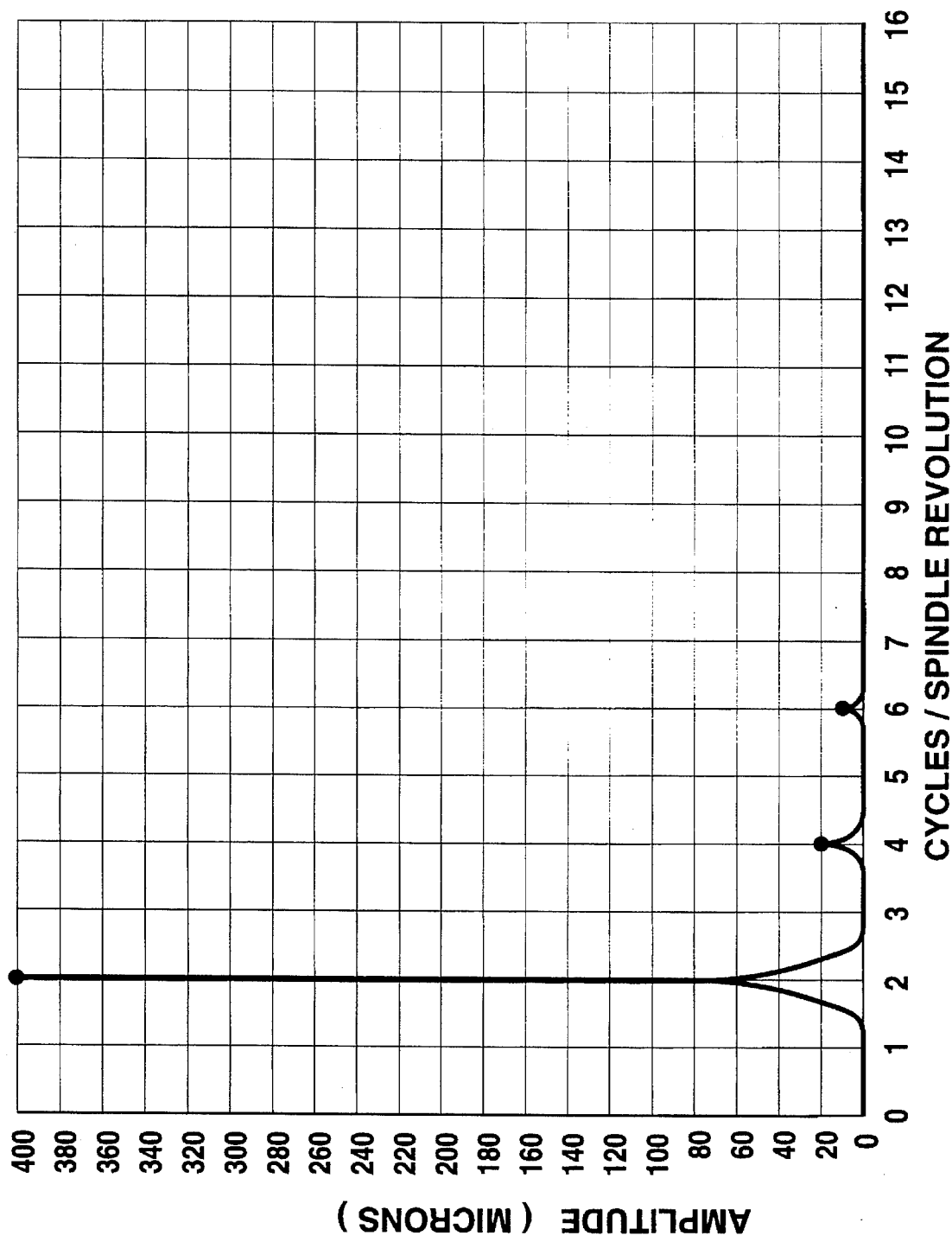
FIG. 6 is a graphical representation of cycles/spindle revolution versus amplitude according to a Fast Fourier Transform of 32 data points around a selected portion of FIG. 3.

In order to calculate component numbers and component values over a selected contour portion, one must first locate 32 points spaced equally around contour portion 40. Component numbers and component values of synchronous component 28 (FIG. 1) for the selected contour portion 40 are obtained by doing a Fast Fourier Transform (FFT) applied to the 32 equally spaced points. The component values are the magnitudes of the first sixteen components of the FFT applied to the 32 points. The result is a graphical representation wherein the X axis is in cycles/spindle revolution and the Y axis is represented in amplitude (microns). This amplitude is the amplitude of each Fourier component of reciprocating lathing tool 28 depending upon the shape of lens 12 around contour portion 40. FIG. 6 depicts this graphical representation having a total of sixteen components (in cycles/spindle revolution) plotted against amplitude. As can be seen from FIG. 6, the amplitude will be greatest at the lower cycles. For a toric lens without prism (such as lens 12 of FIG. 1), the odd numbered components would each have a zero value. Only the even numbered components would be non-zero. As the cycles/spindle revolution increase, the amplitude values will approach zero.

Once the component numbers and component values over a selected contour portion using a Fast Fourier Transform are obtained, a first speed of the spindle component 14 is selected to determine whether it would be an optimum value under the allowed error tolerances for a given application. From the selection of the first speed of spindle 14, the spindle frequency may be calculated. For example, if a first speed of spindle 14 is selected at 600 rpm, the revolutions per second is obtained by dividing the rpm value by 60 to obtain the spindle frequency (rps). For this example, a spindle speed of 600 rpm would have a spindle frequency of 10 rps.

Once the spindle frequency is obtained, it is multiplied by the component numbers to obtain a tool component frequency. For example, the spindle frequency calculation of 10 rps is multiplied by the component numbers described in cycles per spindle revolution found on FIG. 6. By way of example, for a spindle frequency of 10 rps multiplied by a component number of 2 equals a tool component frequency of 20 Hz. The tool component frequency may be calculated for each component number. However, as can be seen in the graphical representation of FIG. 6, for a toric lens without prism, the odd numbered components would have a zero amplitude value.

For each tool component frequency calculated as described above, one must next refer to the graphical representation of the motion error previously calculated (FIGS. 4 and 5). As discussed above, whether one next references FIG. 4 or FIG. 5 will depend on the motion error tolerance value for the particular application. Again, by example, in the event that the motion error tolerance value equals 30 microns, one would refer next to FIG. 5. Referring to FIG. 5, each tool component frequency calculated above is referenced on FIG. 5. The respective motion error is then noted for each tool component frequency. As an example, a tool component frequency of 20 Hz on FIG. 5 will reference a motion error of five percent. A tool component frequency of 40 Hz would have a motion error of eight percent, while a tool component frequency of 60 Hz would have a motion error of fourteen percent.

Once the motion error value of the frequency defined by the component number is obtained (such as by FIG. 5 as discussed above) for each tool component frequency referenced, each motion error value R is then multiplied by the component value to obtain an error prediction for each component number. The component value is the amplitude for each cycle per spindle revolution as has been graphically depicted in FIG. 6. Referring to FIG. 6, each component value for each component number is noted and multiplied by its respective motion error value R at the frequency defined by the component number as calculated above. For example, the motion error value of five percent of the tool component frequency defined by the component number (2) is multiplied by the component value (amplitude=400 microns) at the selected component number (2). For this example, the motion error value R equals five percent which is multiplied by the amplitude, 400 microns, at the component number 2 to obtain an error prediction for each component number (5%×400 microns=20 microns). When component number equals 4, the motion error value R equals eight percent and multiplied by 20 microns (the amplitude where the component number equals 4) to obtain an error prediction of 1.6.

Once the error prediction for each component number is obtained, all error predictions for each component number are combined to obtain a maximum predicted motion error for contour portion 40. For example, 20+1.6+0.3=21.9. The maximum predicted motion error for contour portion 40 of FIG. 3 equals 21.9. As described above, the specified motion error tolerance for the motion error profile of FIG. 5 equals 30 microns. The maximum predicted motion error for contour portion 40 must be less than the motion error tolerance in order for the selected speed of spindle 14 to be acceptable. Since the first selected speed of spindle 14 (600 rpm) reveals an acceptable maximum predicted motion error for contour portion 40 (FIG. 3), a second, higher spindle speed (such as 900 rpm) is selected and the calculation of maximum predicted motion error for contour portion 40 at 900 rpm will be calculated. Because the component values depend only on the contour portion 40 and not on spindle speed, the component values (expressed as amplitude) will be the same, however, because spindle frequency is higher, the frequency at which the motion error function is read for each component will be different. Thus, the maximum predicted motion error will change. This can be seen in Example 2.

Example 2 describes a maximum predicted motion error calculation for contour 40 wherein spindle 14 (FIG. 1) is rotating at a speed of 900 rpm.

EXAMPLE 2

(1) The motion error values R of the tool component over the motion profile for a spindle speed of 900 rpm are the same as the motion error values R for a spindle speed of 600 rpm.

(2) Calculating spindle frequency from the speed of the spindle component:

Spindle Speed=900 rpm÷60=15 rps (3) Multiplying said spindle frequency by selected component numbers to obtain a tool component frequency:

15 rps×2 (component #)=30 Hz 15 rps×4 (component #)=60 Hz 15 rps×6 (component #)=90 Hz (4) Calculating the motion error value R for each tool component frequency: Referring to FIG. 5, comparing motion error values for given tool component frequencies:

At 30 Hz motion error value R=7%

At 60 Hz motion error value R=14%

At 90 Hz motion error value R=35%

(5) Multiplying said motion error value R of the frequency defined by the component number and said component value to obtain an error prediction for each component number:

7%×400 microns (component #=2)=28 microns

14%×20 (component #=4)=2.8 microns

35%×2 microns (component #=6)=0.7 microns (6) Combining said predictions for each component number to obtain a maximum predicted motion error for said contour portion:

28 microns+2.8 microns+2.7 microns=31.5 microns (7) Comparing the maximum predicted motion error for contour portion 40 with the motion error tolerance (30 microns) wherein the maximum predicted motion error (30 microns) must be less than the motion error tolerance:

Since the maximum predicted motion error for contour portion 40, obtained in substep 6 above, exceeds the motion error tolerance, a spindle speed of 900 rpm would be unacceptable.

As can be seen from the calculation of maximum predicted motion error for a spindle speed of 600 rpm discussed above, a spindle speed of 600 rpm would be acceptable. As can be seen from Example 2, the maximum predicted motion error exceeds the motion error tolerance meaning that a spindle speed of 900 Hz would be unacceptable. Therefore, from the calculations of maximum predicted motion errors at a first selected spindle speed and a second selected spindle speed, it can be seen that the optimum speed of spindle 14 (FIG. 1) on contour portion 40 (FIG. 3) will be at or between the first selected spindle speed, 600 rpm, and the second selected spindle speed, 900 rpm, but cannot equal the second selected spindle speed, 900 rpm. Subsequent spindle speed calculations of maximum predicted motion error for contour portion 40 may be necessary in order to define the optimum spindle speed for contour portion 40. The calculations will cease when it is determined that no further useful optimization is possible. For example, a fixed number (10) of different spindle speed values are attempted and the value having a maximum predicted error as close to the motion error tolerance without exceeding the motion error tolerance will be selected. The selection of the spindle speed for each subsequent calculation is based on information obtained from the previous calculations so as to intelligently select subsequent spindle speeds.

Once the optimum speed of spindle 14 (FIG. 1) is obtained for contour portion 40 (FIG. 3), a determination of optimum speed of spindle 14 at contour portions 42, 44, and 46 must be predicted. The optimum speed of spindle 14 for contour portions 42, 44, and 46 may not be the same as the optimum speed of spindle 14 for contour portion 40. The optimum speed of spindle 14 over the entire motion profile of face 13 of lens 12 is calculated by interpolating between the optimum spindle speeds for all contour portions, 42, 44 and 46 of the motion profile.

Thus, it is apparent that there has been provided, in accordance with the invention, a method for spindle speed optimization of motion profile that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A method of speed optimization of a spindle component of a machine having at least a synchronous component and a spindle component over a motion profile, comprising:

a first step, including:
obtaining motion error values R of the synchronous component over said motion profile wherein each of said motion error values R is a function of frequency;
specifying the motion error tolerance for said motion profile according to the requirement of the application;
identifying a plurality of contour portions of the motion profile;
calculating component numbers and component values of the synchronous component over a selected contour portion using a Fast Fourier Transform;
selecting a first speed of the spindle component;

a second step, including:
calculating spindle frequency from said speed of the spindle component;
multiplying said spindle frequency by selected component numbers to obtain tool component frequencies;
calculating said motion error value R for selected tool component frequencies;
multiplying said motion error value R at the frequency defined by the component number and said component value to obtain an error prediction for each component number;
combining said predictions for each component number to obtain a maximum predicted motion error for said contour portion;
comparing said maximum predicted motion error for said contour portion with said motion error tolerance wherein said maximum predicted motion error must be less than said motion error tolerance;

repeating said second step for a second spindle speed;

selecting the greatest spindle speed wherein said maximum predicted motion error remains less than said tolerance.

2. The method of claim 1 further including:

calculating an optimum spindle speed for each selected contour portion of the motion profile to obtain a set of optimum spindle speeds for said motion profile;

interpolating between each selected contour portion in said set of optimum spindle speeds.

* * * * *